United States Patent
Hirano et al.

(10) Patent No.: US 7,019,932 B2
(45) Date of Patent: Mar. 28, 2006

(54) DISK UNIT HAVING MECHANISM FOR LOADING AND UNLOADING HEAD UNIFORMLY IN CIRCUMFERENTIAL DIRECTION OF A DISK

(75) Inventors: Masakazu Hirano, Kawasaki (JP); Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 09/866,422

(22) Filed: May 25, 2001

(65) Prior Publication Data

US 2002/0089776 A1 Jul. 11, 2002

(30) Foreign Application Priority Data

Nov. 29, 2000 (JP) .................................. 2000-363900

(51) Int. Cl.
*G11B 21/02* (2006.01)

(52) U.S. Cl. .......................................................... 360/75
(58) Field of Classification Search .................. 360/75, 360/254.3, 254.8
See application file for complete search history.

(56) References Cited

U.S. PATENT DOCUMENTS

| | | | | |
|---|---|---|---|---|
| 4,202,020 A | | 5/1980 | Lovgren et al. ............. 360/75 |
| 5,831,786 A | * | 11/1998 | Boutaghou et al. ............ 360/75 |
| 5,936,788 A | * | 8/1999 | Boutaghou et al. ............ 360/75 |
| 6,134,071 A | * | 10/2000 | Andoh et al. .................. 360/75 |
| 6,226,155 B1 | * | 5/2001 | Watanabe et al. ......... 360/254.8 |
| 6,229,663 B1 | * | 5/2001 | Yoneda et al. ................ 360/75 |
| 6,236,527 B1 | * | 5/2001 | Uchiike et al. ............... 360/75 |
| 6,369,988 B1 | * | 4/2002 | Yoshida et al. .......... 360/254.3 |
| 6,449,128 B1 | * | 9/2002 | Abe ........................ 360/254.8 |
| 6,512,650 B1 | * | 1/2003 | Tanner ........................ 360/75 |
| 6,560,057 B1 | * | 5/2003 | Klaassen et al. .............. 360/75 |
| 6,563,660 B1 | * | 5/2003 | Hirano et al. ................. 360/75 |
| 6,590,731 B1 | * | 7/2003 | Pan et al. ..................... 360/75 |
| 6,590,732 B1 | * | 7/2003 | Kitagawa et al. ............. 360/75 |

FOREIGN PATENT DOCUMENTS

| | | |
|---|---|---|
| JP | 06-076515 | 3/1994 |
| JP | 07-272424 | 10/1995 |

* cited by examiner

*Primary Examiner*—David Hudspeth
*Assistant Examiner*—Fred F. Tzeng
(74) *Attorney, Agent, or Firm*—Greer, Burns & Crain, Ltd.

(57) ABSTRACT

A disk unit has a function of loading a head on a disk from a holding mechanism during a load operation and unloading the head from the disk during an unload operation. The disk unit includes a controller which controls a movement of the head so that the loading operation and the unloading operation are carried out in a specific region on the disk, and the specific region extends for an angular range smaller than 360°. Alternatively, the controller controls the movement of the head so that the loading operation and the unloading operation are carried out uniformly in a circumferential direction of the disk within a specific region on the disk.

16 Claims, 15 Drawing Sheets

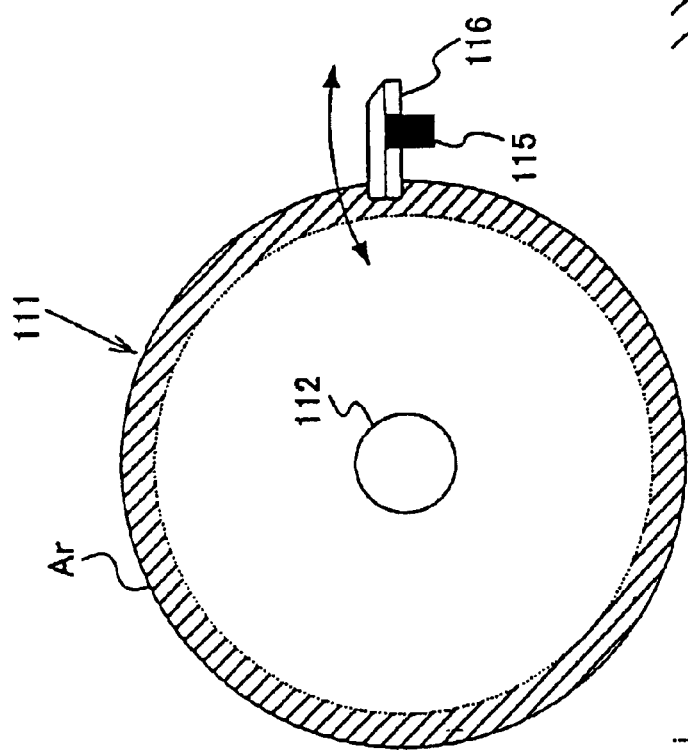
FIG. 15A
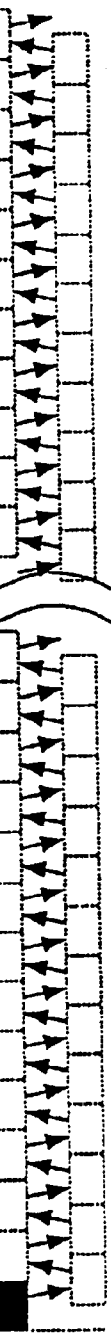
FIG. 15B
FIG. 15C

DISK UNIT HAVING MECHANISM FOR LOADING AND UNLOADING HEAD UNIFORMLY IN CIRCUMFERENTIAL DIRECTION OF A DISK

BACKGROUND OF THE INVENTION

This application claims the benefit of a Japanese Patent Application No. 2000-363900 filed Nov. 29, 2000, in the Japanese Patent Office, the disclosure of which is hereby incorporated by reference.

1. Field of the Invention

The present invention generally relates to disk units, and more particularly to a disk unit which loads a head with respect to a disk from a holding mechanism when making an access to the disk, and unloads the head from the disk to the holding mechanism when making no access to the disk.

There are demands to increase the storage capacity of information storage apparatuses such as magnetic disk units. In order to increase the storage capacity, it is necessary to increase a recording region on the disk.

In the magnetic disk unit, the disk rotates at a predetermined speed. The head is arranged to confront the disk, and is held in a state where the head slightly floats from the disk due to the rotation of the disk. The head can record information on and/or reproduce information from the disk in this floating state, without making direct contact with the disk. Accordingly, the disk is prevented from being damaged by the head.

The head floats from the disk when the disk rotates at the predetermined speed. When the rotational speed of the disk is reduced or the disk stops rotating, the head may make direct contact with the disk. For this reason, a holding mechanism which is often referred to as a ramp mechanism is provided to hold the head to a receded position where the head will not make direct contact with the disk.

2. Description of the Related Art

FIGS. 1A, 1B and 2 are diagrams for explaining an example of a conventional disk unit. FIG. 1B is a plan view of the conventional disk unit, and FIG. 1A is a cross sectional view of the conventional disk unit taken along a one-dot chain line in FIG. 1B. FIG. 2 is a system block diagram showing the conventional disk unit.

As shown in FIGS. 1A and 1B, a disk unit (HDD: hard disk drive) 10 generally includes a disk enclosure (DE) 11 and a printed circuit assembly (PCA) 12. The disk enclosure 11 includes a disk 111, a spindle motor 112, a voice coil motor (VCM) 113, an arm 114, a head 115, and a ramp mechanism (holding mechanism) 116.

The disk 111 is rotatable in a direction A by the spindle motor 112. In addition, the arm 114 is pivotable in a direction B by the voice coil motor 113. The head 115 is fixed at a tip end of the arm 114. By pivoting the arm 114 in the direction B by the voice coil motor 113, the head 115 moves in a radial direction of the disk 111, so that the head 115 can scan a desired track on the disk 111. The ramp mechanism 116 is arranged on an outer periphery of the disk 111. The ramp mechanism 116 engages the tip end of the arm 114, and separates the head 115 from the disk 111 and to hold the head 115 in this separated position.

As shown in FIG. 2, the head 115 reproduces a signal from the disk 111, and supplies the reproduced signal to a head IC 117 which amplifies the reproduced signal before supplying the reproduced signal to the printed circuit assembly 12. A recording signal from the printed circuit assembly 12 is supplied to the head via the head IC 117, so as to record the recording signal on the disk 111.

The printed circuit assembly 12 includes a hard disk controller (HDC) 121, a RAM 122, a ROM 123, a MPU 124, a read channel (RDC) 125, a servo controller (SVC) 126, and drivers 127 and 128.

The MPU 124 executes a program stored in the ROM 123, and controls the voice coil motor 113 via the servo controller 126, so as to carry out a ramp load operation of a ramp unload operation. The ramp load operation loads the head 115 on the disk 111 from the ramp mechanism 116, and the ramp unload operation unloads the head from the disk 111 to the ramp mechanism 116.

In the conventional disk unit 10, the ramp load operation is carried out immediately when a ramp load command from the hard disk controller 121 is recognized, and the ramp unload operation is carried out immediately when a ramp unload command from the hard disk controller 121 is recognized. Hence, a position where the head 115 is loaded on the disk 111 from the ramp mechanism 116, and a position where the head 115 is unloaded from the disk 111 to the ramp mechanism 116 are not specified.

For this reason, in order to prevent an error caused by damage to the disk 111 by the head 115 during the ramp load operation and/or the ramp unload operation, a data recording prohibit region Ad is provided on the disk 111 as shown in FIG. 3. FIG. 3 is a diagram for explaining the data recording prohibit region Ad in which the data recording is prohibited. The data recording prohibit region Ad has a ring shape, as indicated by the hatching in FIG. 3. This data recording prohibit region Ad corresponds to the position where the head 115 is loaded by the ramp load operation and the position where the head 115 is unloaded by the ramp unload operation.

However, according to the conventional disk unit 10, an increase of the storage capacity is limited by the data recording prohibit region Ad which is provided on the disk 111 to prevent an error from being generated due to the damage to the disk 111 by the head 115 during the ramp load operation and/or the ramp unload operation. Since the data recording prohibit region Ad is provided in the ring shape in the outer peripheral region of the disk 111 and the data recording density is higher in the outer peripheral region of the disk 111, there is a problem in that the increase of the storage capacity is greatly limited by the data recording prohibit region Ad.

SUMMARY OF THE INVENTION

Accordingly, it is a general object of the present invention to provide a novel and useful disk unit in which the problem described above is eliminated.

Another and more specific object of the present invention is to provide a disk unit which can increase a data recording region on a disk by reducing a data recording prohibit region on the disk.

Still another object of the present invention is to provide a disk unit having a function of loading a head on a disk from a holding mechanism during a load operation and unloading the head from the disk during an unload operation, comprising a controller which controls a movement of the head so that the loading operation and the unloading operation are carried out in a specific region on the disk, where the specific region extends through an angular range smaller than 360°. According to the disk unit of the present invention, it is possible to prevent deterioration of a protection layer which is formed on the disk, caused by the load and unload operations, in regions other than the specific region, so that the serviceable life of the disk is extended. In addition, it is possible to increase the storage capacity because the data recording only needs to be prohibited within the specific region.

The disk unit may further comprise a motor which rotates the disk, and the controller may control the movement of the head so that the load operation and the unload operation are carried out based on a rotary position of the motor. In this case, it is possible to simplify the structure of the disk unit because there is no need to provide a mechanism exclusively for detecting the timings of the load operation and the unload operation so that the load operation and the unload operation are carried out within the specific region of the disk.

On the other hand, the controller may control the movement of the head so that the unload operation is carried out in the specific region based on servo information which is prerecorded on the disk. In this case, it is possible to accurately carry out the unload operation within the specific region of the disk based on the servo information.

A further object of the present invention is to provide a disk unit having a function of loading a head on a disk from a holding mechanism during a load operation and unloading the head from the disk during an unload operation, comprising a controller which controls a movement of the head so that the loading operation and the unloading operation are carried out uniformly in a circumferential direction of the disk within a specific region on the disk. According to the disk unit of the present invention, the deterioration of a protection layer which is formed on the disk becomes uniform, caused by the load and unload operations, is uniform within the specific region without being concentrated at certain locations. For this reason, the serviceable life of the protection layer is extended, thereby enabling data recording to be made also within the specific region of the disk. Consequently, the storage capacity can be increased because there is no need to provide a data recording prohibit region on the disk.

In this latter disk unit, the controller may control the movement of the head so that a position on the disk where the head is loaded during the load operation and the head is unloaded during the unload operation is successively shifted by a predetermined distance in the circumferential direction of the disk within the specific region on the disk for each load operation and each unload operation.

Other objects and further features of the present invention will be apparent from the following detailed description when read in conjunction with the accompanying drawings.

BRIEF DESCRIPTION OF THE DRAWINGS

FIGS. 15A, 15B and 15C respectively are diagrams for explaining the operation of the second embodiment of the disk unit.

DESCRIPTION OF THE PREFERRED EMBODIMENTS

Figure 3:
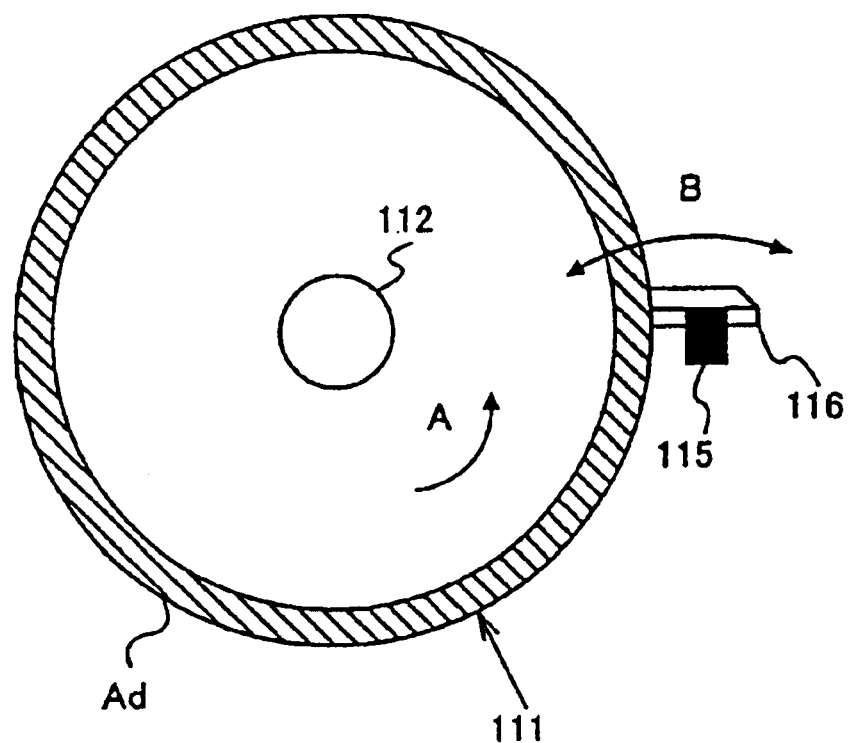
FIG. 3 is a diagram for explaining a data recording prohibit region on a disk.
Figure 4:
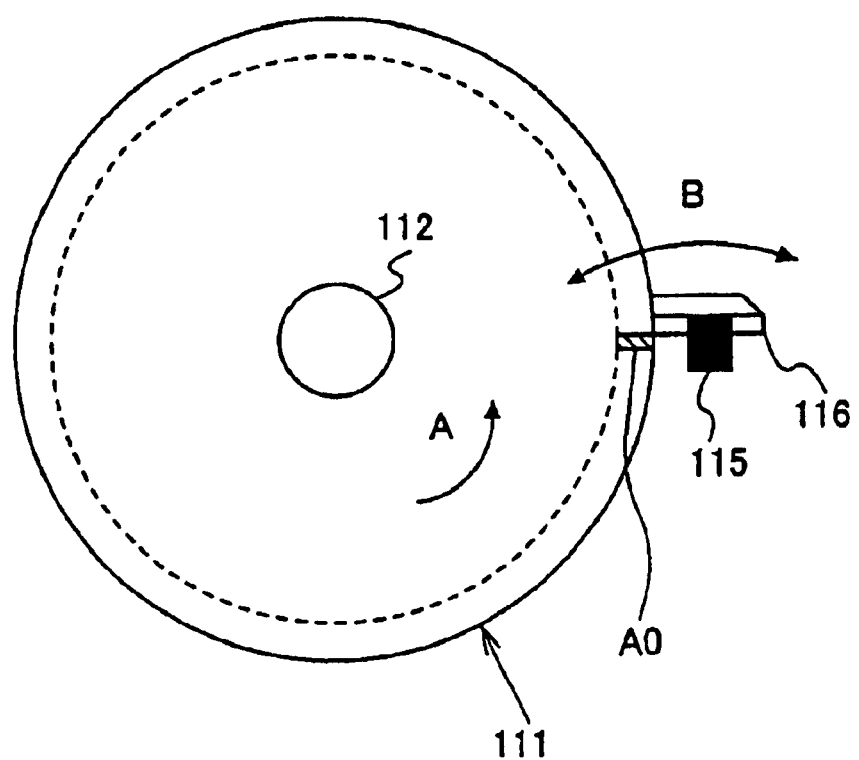
FIG. 4 is a diagram for explaining the operation of a first embodiment of a disk unit according to the present invention.

A description will be given of a first embodiment of a disk unit according to the present invention, by referring to FIG. 4. FIG. 4 is a diagram for explaining the operation of this first embodiment of the disk unit. In FIG. 4, those parts which are the same as those corresponding parts in FIG. 3 are designated by the same reference numerals, and a description thereof will be omitted.

Figures 1A, 1B:
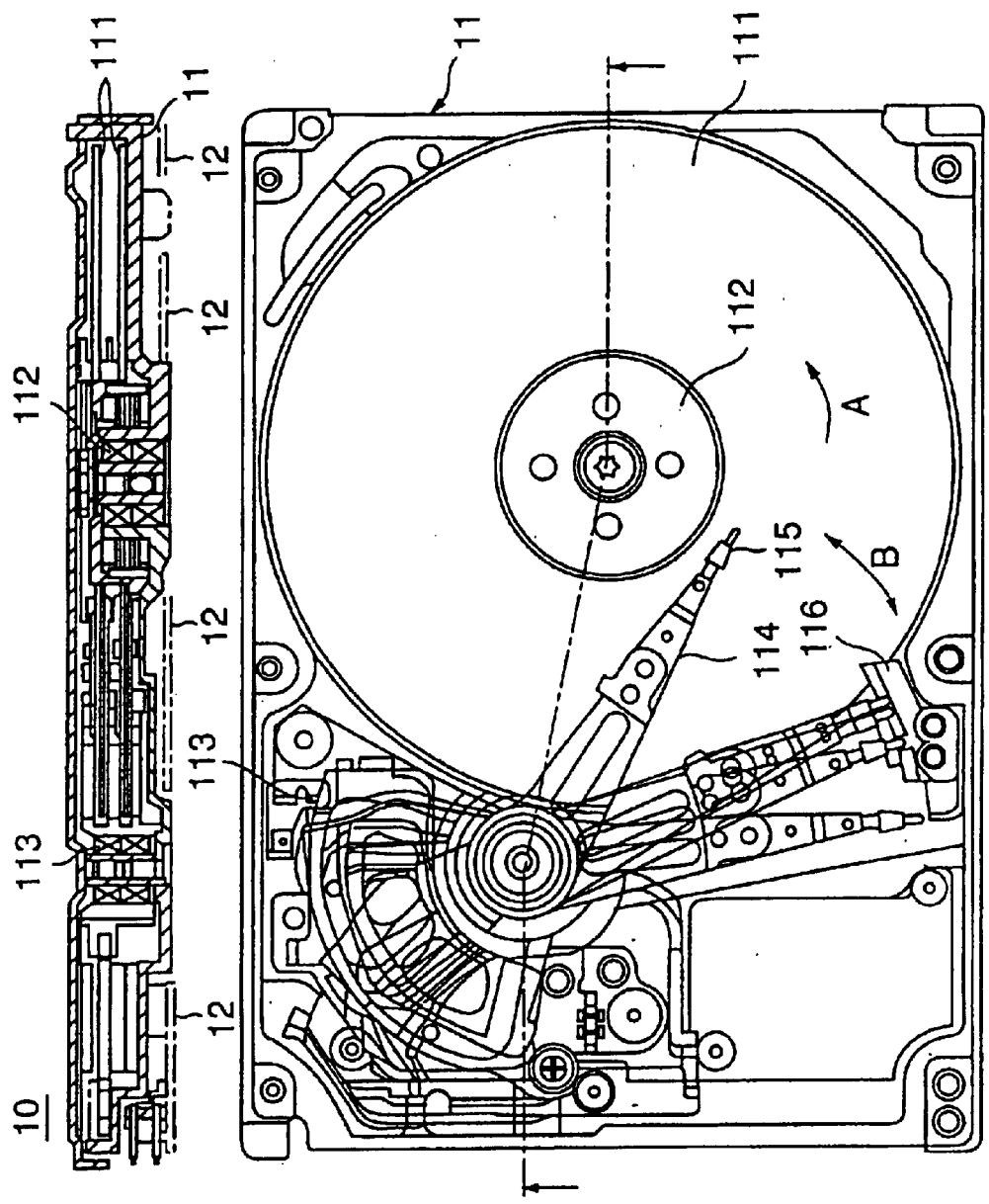
FIGS. 1A and 1B respectively are a cross sectional view and a plan view showing an example of a conventional disk unit.
Figure 2:
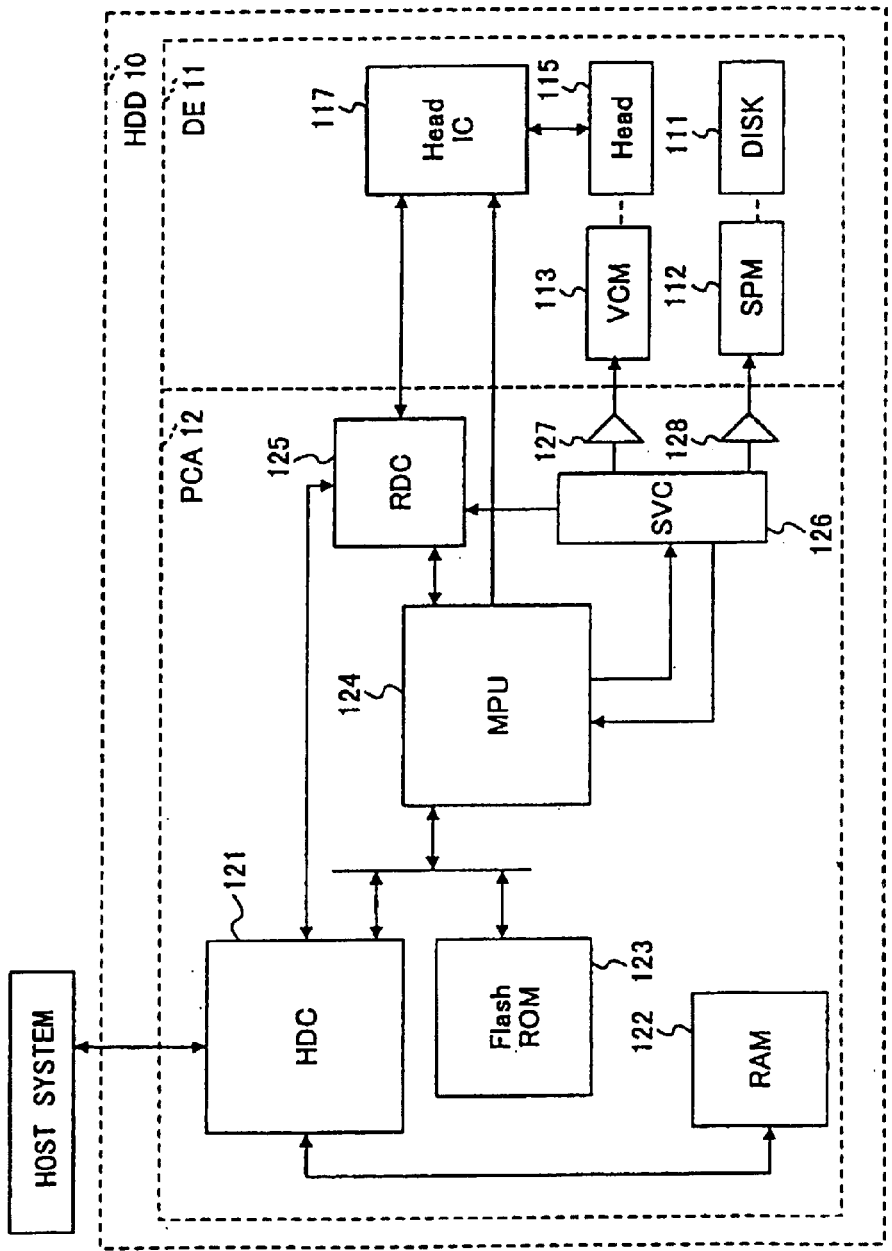
FIG. 2 is a system block diagram showing the example of the conventional disk unit.

The basic structure of this first embodiment of the disk unit is the same as the basic structure of the conventional disk unit 10 shown in FIGS. 1A, 1B and 2 described above, and a description and illustration thereof will be omitted. In this first embodiment, a ramp load operation loads the head 115 from the ramp mechanism 116 to a specific region A0 on the disk 111, indicated by the hatching, and a ramp unload operation unloads the head 115 from the specific region A0 on the disk 111 to the ramp mechanism 116. The specific region A0 extends for an angular range smaller than 360°. A protection layer which is made of a protecting agent is formed on a recording surface of the disk 111 to protect the recording surface, and a thickness of this protection layer is larger in at least the specific region A0 compared to other regions of the disk 111. The protection layer protects the disk 111 from being damaged by the head 115 upon contact, and also protects the head 115 upon contact with the disk 111.

The head 115 will not be loaded and unloaded in the regions other than the specific region A0 on the disk 111. Hence, the protection layer will not be deteriorated by the loading and unloading of the head 115 in the regions other than the specific region A0 on the disk 111. Hence, even in the region which is in the outer periphery of the disk 111 indicated by the dotted line in FIG. 4 and is other than the specific region A0, it is possible to record and reproduce data similar to the other regions on the inner peripheral side from the outer periphery of the disk 111.

When carrying out the ramp load operation, the head 115 is held by the ramp mechanism 116, and it is not possible to reproduce servo information which is prerecorded on the disk 111. The servo information includes information indicating the position on the disk 111. For this reason, it is not possible to determine a load timing for the head 115 from the servo information. Accordingly, this embodiment determines the load timing of the head 115 based on the rotation of the spindle motor 112 which rotates the disk 111.

Figure 5:
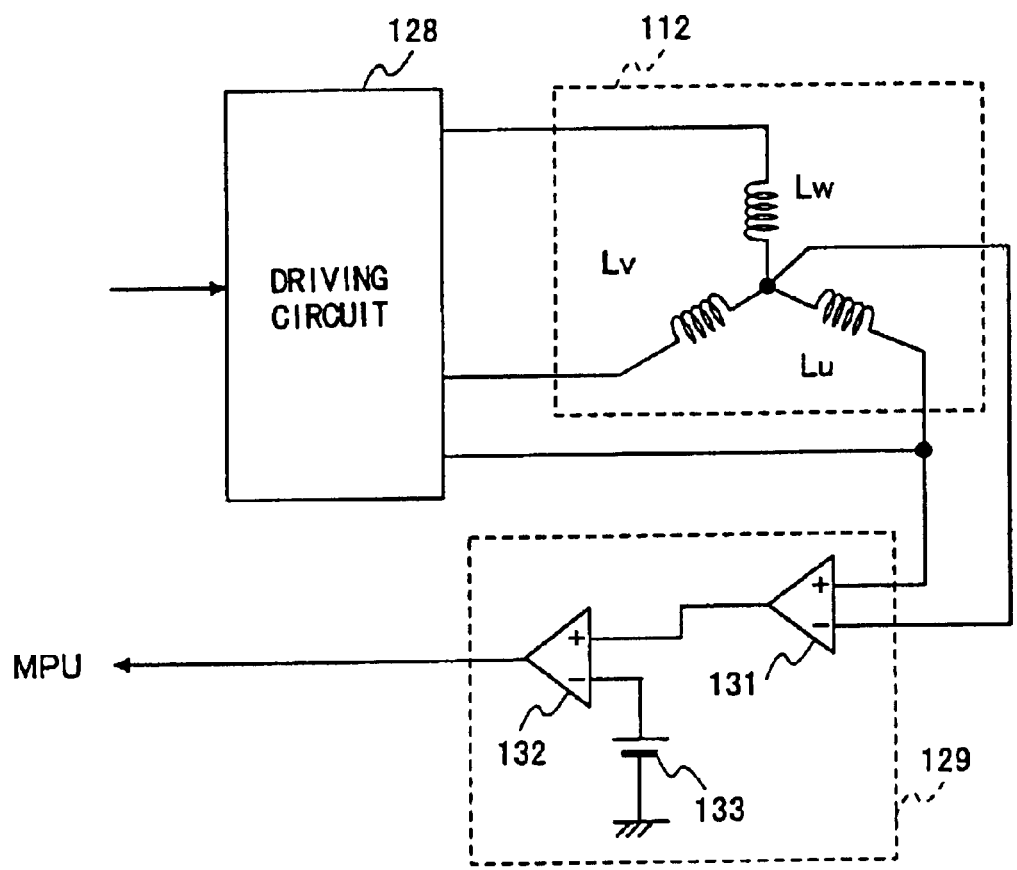
FIG. 5 is a system block diagram showing a spindle motor driving circuit of the first embodiment of the disk unit.

FIG. 5 is a system block diagram showing a spindle motor driving circuit of this embodiment.

For example, the spindle motor 112 is made of a D.C. 3-phase brushless motor. A driving circuit 128 successively supplies a driving current to coils Lu, Lv and Lw of the spindle motor 112. The coils Lu, Lv and Lw generate a rotary magnetic field depending on the driving current from the driving circuit 128. A rotor (not shown) of the spindle motor 112 rotates depending on the rotary magnetic fields generated by the coils Lu, Lv and Lw, to thereby rotate the disk 111.

Back-electromotive voltages are generated by the coils Lu, Lv and Lw depending on a rotary position of the rotor. A detection circuit 129 detects the back-electromotive voltage generated by the coil Lu.

The detection circuit 129 includes a differential amplifier 131, a comparator 132, and a reference voltage source 133. The differential amplifier 131 detects a difference between an intermediate potential and the back-electromotive voltage of the coil Lu. The comparator 132 compares an output of the differential amplifier 131 and a reference voltage from the reference voltage source 133, and outputs a high-level detection signal when the output of the differential amplifier 131 is larger than the reference voltage and outputs a low-level detection signal when the output of the differential amplifier 131 is smaller than or equal to the reference voltage.

The detection signal output from the detection circuit 129 is supplied to the MPU 124. The MPU 124 controls the voice coil motor 113 based on the detection signal from the detection circuit 129.

Figure 6:
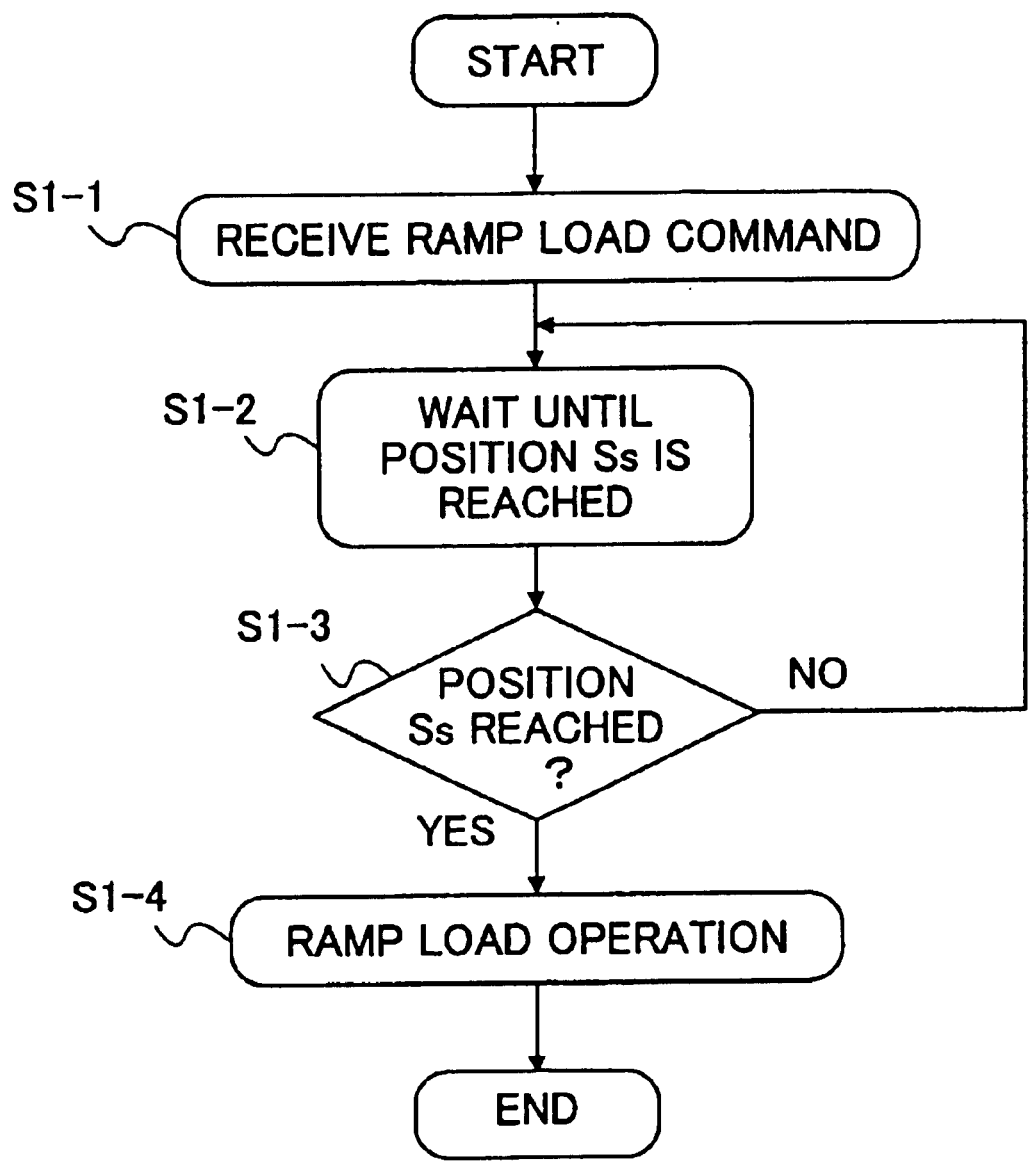
FIG. 6 is a flow chart for explaining the operation of the first embodiment of the disk unit during a ramp load operation.
Figure 7:
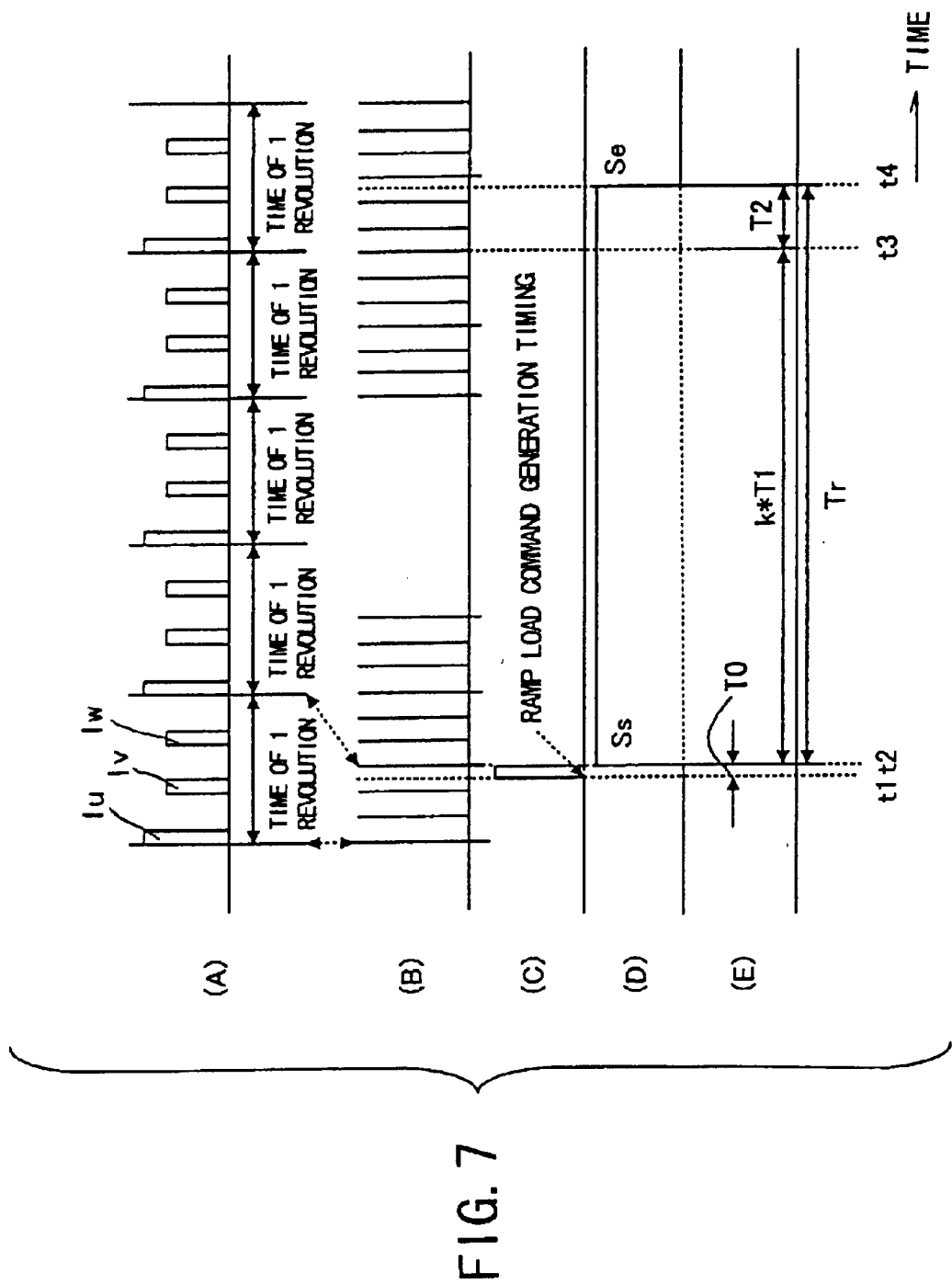
FIG. 7 is a timing chart for explaining the ramp load operation of the first embodiment of the disk unit.

FIG. 6 is a flow chart for explaining the operation of this embodiment during a ramp load operation. In addition, FIG. 7 is a timing chart for explaining the ramp load operation of this embodiment. More particularly, FIG. 7(A) shows driving currents Iu, Iv and Iw supplied to the coils Lu, Lv and Lw, FIG. 7(B) shows the detection signal output from the detection circuit 129, FIG. 7(C) shows an issuing timing of the ramp load command from the hard disk controller 121, and FIG. 7(D) shows the operating timing of the disk unit.

When the MPU 124 receives the ramp load command from the hard disk controller 121 in a step S1-1 shown in FIG. 6 at a time t1 shown in FIG. 7, a step S1-2 waits for a time T0 until a ramp load position Ss is reached. For example, the ramp load position Ss corresponds to a timing when the detection signal from the detection circuit 129 makes a transition from the low level to the high level.

A step S1-3 decides whether or not the ramp load position Ss is reached, based on the detection signal from the detection circuit 129. If the decision result in the step S1-3 becomes YES at a time t2 in FIG. 7, a step S1-4 controls the voice coil motor 113 so as to carry out the ramp load operation. When the step S1-4 carries out the ramp load operation, the head 115 is loaded on the disk 111 in approximately a predetermined time Tr, at a time t4. The disk 111 undergoes k revolutions by a time t3 from the time t2.

In this state, the head 115 starts to move from the predetermined ramp load position Ss and a moving speed of the head 115 is controlled so that the loading is made in approximately the predetermined time Tr. Further, the head 115 is always loaded to the specific region A0 on the disk 111.

The moving speed of the head 115 can be obtained by detecting the back-electromotive voltage of the voice coil motor 113. Hence, the head 115 can be loaded on the disk 111 within the predetermined time Tr by controlling the speed of the head 115 according to a predetermined speed control sequence.

The specific region A0 on the disk 111 can be calculated in the following manner, based on the ramp load position Ss.

Figure 8:
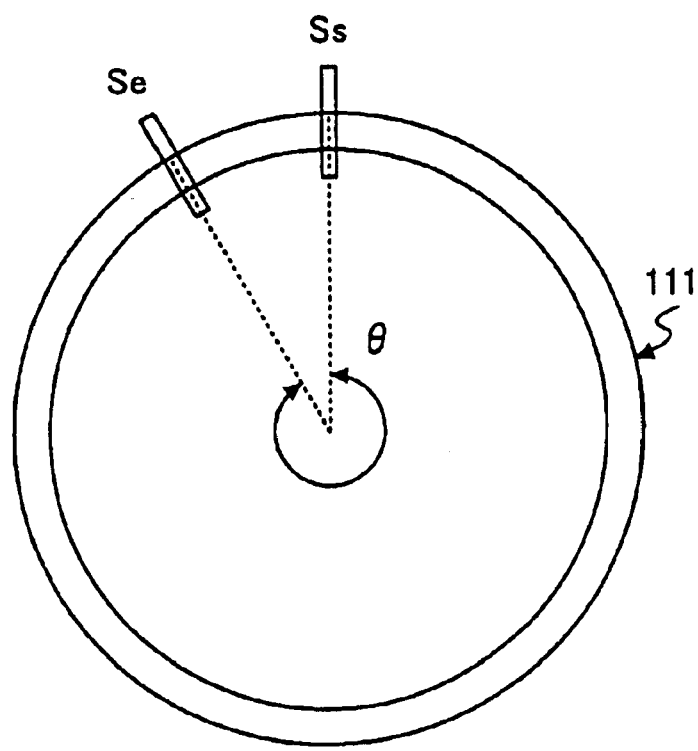
FIG. 8 is a diagram for explaining a positioning method employed by the first embodiment of the disk unit.

FIG. 8 is a diagram for explaining a positioning method employed by this first embodiment.

For example, when the rotational speed of the disk 111 is denoted by w, the ramp load position is denoted by Ss, a loading position where the head 115 is loaded on the disk 111 is denoted by Se, and an angle between the positions Ss and Se on the disk 111 is denoted by θ°, a time T2 required for the disk 111 to rotate the angle θ° can be described by the following formula (1).

$$T2 = (\theta/360°) * (60/w) \quad (1)$$

If a time required for the disk 111 to make one revolution is denoted by T1, this time T1 can be described by the following formula (2).

$$T1 = 60/w \quad (2)$$

On the other hand, the predetermined time Tr required for the head 115 to move from the ramp load position Ss to the loading position Se can be described by the following formula (3), where k denotes a number of revolutions of the disk 111 from the time t2 to the time t3.

$$Tr = (k * T1) + T2 \quad (3)$$
$$= (60/w) * (k + (\theta/360°))$$

Therefore, the angle θ can be described by the following formula (4), based on the formulas (1) through (3).

$$\theta = ((w * Tr/60) + k) * 360° \quad (4)$$

Hence, when the ramp load position Ss is determined, it is possible to obtain the loading position Se from the angle θ.

For example, when it is assumed for the sake of convenience that the rotational speed w of the disk 111 is 4200 rpm, the time T1 required for the disk 111 to make one revolution becomes 14.28 msec. Hence, if an inconsistency generated by the speed control of the voice coil motor 113 for the ramp load operation is within 1 msec, an error with respect to one revolution of the disk 111 becomes 7% or less.

When this error is taken into account, a range required to load the head 115 on the disk 111, that is, a length of the specific region A0 in the circumferential direction of the disk 111 within the outer peripheral portion of the disk 111, becomes approximately 22% with respect to one revolution of the disk 111. For this reason, the head 115 will not be loaded in a remaining region of approximately 78% within the outer peripheral portion of the disk 111. In other words, this remaining region of approximately 78% can be used as a data recording region, so that the storage capacity of the disk 111 can be increased thereby.

In the conventional case shown in FIG. 3, the data recording prohibit region Ad in which the data recording is prohibited because the head 115 may make direct contact with the disk 111 during the ramp load operation, amounts to approximately 10% of the entire recording surface of the disk 111.

But according to this first embodiment, approximately 22% of the data recording prohibit region Ad which amounts to approximately 10% of the entire recording surface of the disk 111, can be used as the data recording region, as described above. Consequently, this first embodiment can improve the storage capacity to approximately 1.08 times as compared to the conventional case.

A preamble pattern, which is a synchronizing signal, is prerecorded in the specific region A0 of the disk 111. When the head 115 is loaded to the specific region A0 of the disk 111, it is possible to immediately reproduce the preamble pattern. The operation of the read channel 125 can be synchronized to the servo information based on the reproduced preamble pattern, and thus, the read channel 125 can immediately reproduce the next servo information.

Accordingly, the present address on the disk 111 can be recognized immediately, so that it is possible to access a desired address at a high speed.

Figure 9:
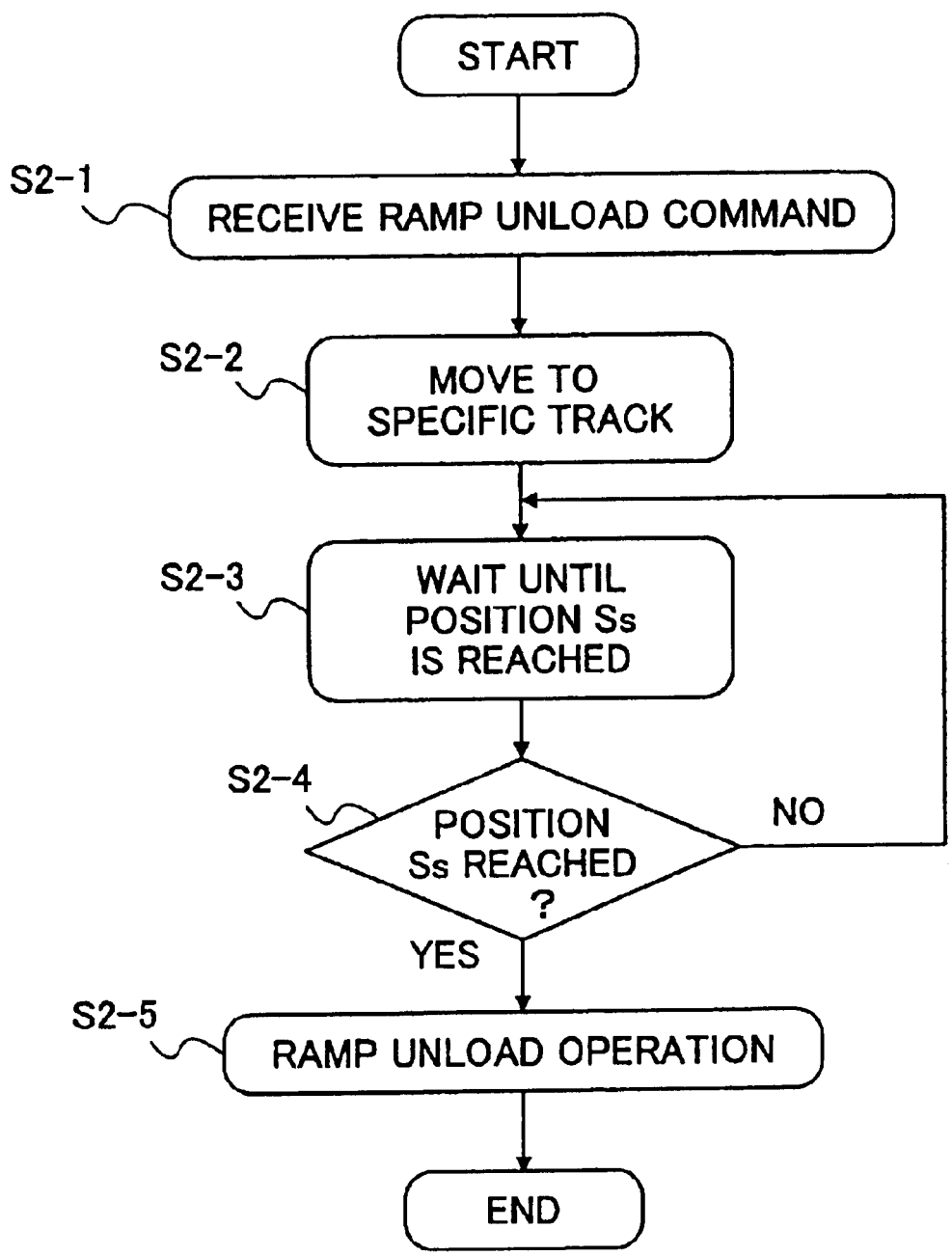
FIG. 9 is a flow chart for explaining the operation of the first embodiment of the disk unit during a ramp unload operation.

Next, a description will be given of the ramp unload operation of this first embodiment, by referring to FIG. 9. FIG. 9 is a flow chart for explaining the operation of this first embodiment during the ramp unload operation.

In FIG. 9, when the MPU 124 receives a ramp unload command from the hard disk controller 121 in a step S2-1, a step S2-2 controls the voice coil motor 113 so that the head moves to a specific track (or cylinder) on the disk 111. After the head 115 moves to the specific track in the step S2-2, a step S2-3 waits until a ramp unload position Ss is detected. This ramp unload position Ss is the same as the ramp load position Ss described above.

A step S2-4 decides whether or not the ramp unload position Ss is reached, based on the detection signal from the detection circuit 129, similarly to deciding whether or not the ramp load position Ss is reached. If the decision result in the step S2-4 becomes YES, a step S2-5 controls the voice coil motor 113 so as to carry out the ramp unload operation. When the step S2-5 carries out the ramp unload operation and a predetermined elapses, the head 115 reaches the specific region A0 of the disk 111, and the arm 114 is engaged by the ramp mechanism 116 to separate the head 115 from the disk 111.

The specific track on the disk 111 is set so that the head 115 reaches the specific region A0 of the disk 111 after the predetermined time elapses from the time when the head 115 reaches the ramp unload position Ss, that is, from the time when the detection signal from the detection circuit 129 undergoes a transition, and the ramp unload operation is started such that the arm 114 engages the ramp mechanism 116 and the head 115 is separated from the disk 111.

During the ramp unload operation, the head 115 can reproduce the servo information prerecorded on the disk 111. For this reason, the head 115 can be positioned to the specific region A0 of the disk 111 based on the reproduced servo information.

In the first embodiment described above, one specific region A0 is provided in the outer periphery of the disk 111. However, it is of course possible to provide the specific region A0 at a plurality of locations in the outer periphery of the disk 111.

Figure 10:
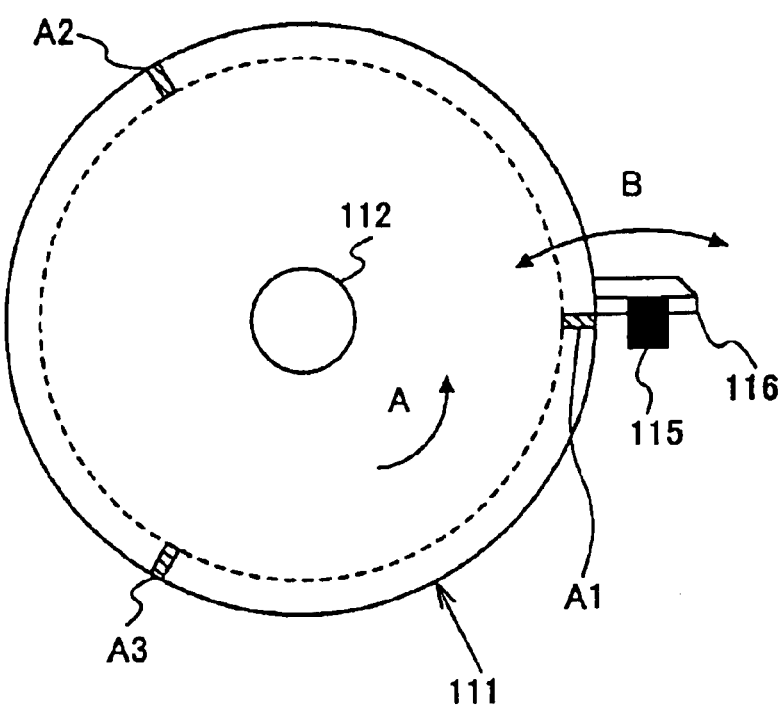
FIG. 10 is a diagram for explaining the operation of a first modification of the first embodiment of the disk unit.

Next, a description will be given of a first modification of the first embodiment of the disk unit according to the present invention, by referring to FIG. 10. FIG. 10 is a diagram for explaining the operation of this first modification. In FIG. 10, those parts which are the same as those corresponding parts in FIG. 4 are designated by the same reference numerals, and a description thereof will be omitted.

In this first modification, three specific regions A1, A2 and A3 are provided in the outer periphery of the disk 111 as indicated by the hatching in FIG. 10.

Hence, one detection circuit 129 for detecting the back-electromotive voltage is provided for each of the coils Lu, Lv and Lw of the spindle motor 113, for example, and the detection signal from each detection circuit 129 is supplied to the MPU 124. The MPU 124 carries out a process similar to that described above in conjunction with FIG. 6 with respect to the detection signal from each detection circuit 129, that is, with respect to the detected back-electromotive voltage generated from each of the coils Lu, Lv and Lw. As a result, it is possible to load the head 115 on the disk 111 and unload the head 115 from the disk 111 at any of the three specific regions A1, A2 and A3 of the disk 111.

According to this first modification, the ramp load position Ss is detected three times at the outer periphery of the disk 111 during one revolution of the disk 111, and the ramp load operation and the ramp unload operation can be carried out at any of the three specific regions A1, A2 and A3 of the disk 111. Hence, it is possible to reduce the wait time from the time when the ramp load command or the ramp unload command is received until the ramp load position Ss or the ramp unload position Ss is detected. As a result, it is possible to carry out the ramp load operation and the ramp unload operation at a high speed.

In addition, during the ramp unload operation, the head 115 can reproduce the servo information which is prerecorded on the disk 111. Thus, it is possible to carry out the ramp unload operation by specifying one of the three specific regions A1, A2 and A3 based on the reproduced servo information.

The ramp unload operation can be started when a predetermined address is detected from the reproduced servo information. In this state, the predetermined address where the ramp unload operation is started is set so that the head 115 reaches one of the three specific regions A1, A2 and A3 of the disk 111 after a predetermined time elapses from the time when the head 115 reaches the ramp unload position Ss and the ramp unload operation is started such that the arm 114 engages the ramp mechanism 116 and the head 115 is separated from the disk 111.

Figure 11:
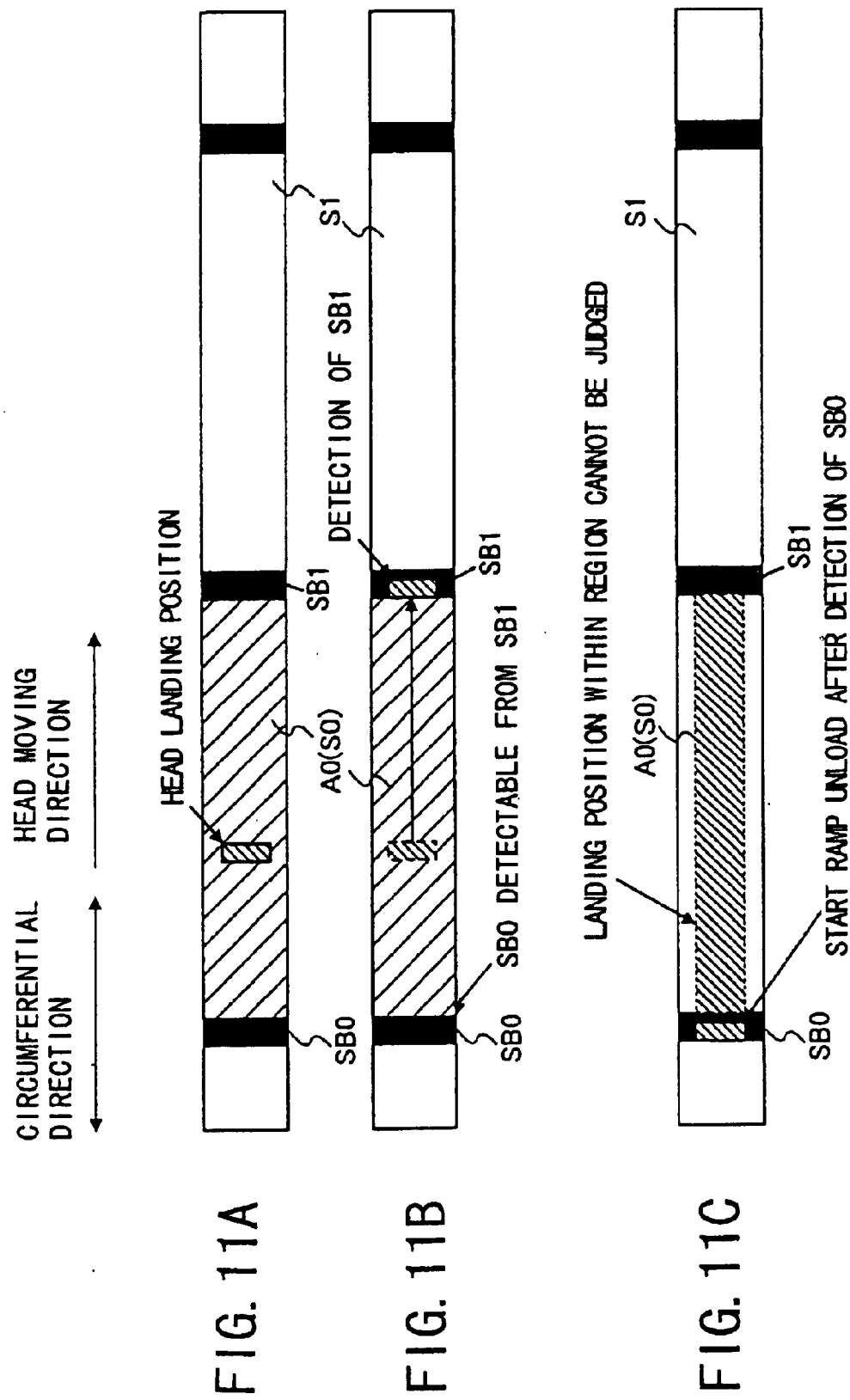
FIGS. 11A, 11B and 11C respectively are diagrams for explaining the operation of a second modification of the first embodiment of the disk unit.

FIGS. 11A, 11B and 11C respectively are diagrams for explaining the operation of a second modification of the first embodiment of the disk unit. FIGS. 11A and 11B are diagrams for explaining the ramp load operation of this second modification of the first embodiment, and FIG. 11C is a diagram for explaining the ramp unload operation of this second modification of the first embodiment In FIGS. 11A through 11C, the leftwardly descending hatching indicates the position of the head 115.

During the ramp load operation, when the head 115 is loaded to a sector S0 which is set within the specific region A0 on the disk 111 in FIG. 11A, servo information SB1 of a sector S1 which is next to the sector S0 is reproduced as shown in FIG. 11B. Hence, the address of the sector S1 can be recognized from the reproduced servo information SB1, and the address of the sector S0 within the specific region A0 can be recognized from the recognized address of the sector S1.

On the other hand, during the ramp unload operation, servo information SB0 of the sector S0 within the specific region A0 on the disk 111 in FIG. 11C is reproduced, and the address of the sector S0 is recognized from the reproduced servo information SB0. The ramp unload operation is started when the address of the sector S0 is recognized, and the ramp unload operation is completed when the sector S0 within the specific region A0 is reached.

According to this modification, it is possible to accurately position the head 115 by positioning the head 115 based on the address within the servo information.

Although the ramp unload operation is started from the address of the sector S0 in FIG. 11C, it is of course possible to appropriately set the address where the ramp unload operation is to start in a case where a time from the start of the ramp unload operation to the completion of the ramp unload operation is relatively long compared to the sector length.

Figure 12:
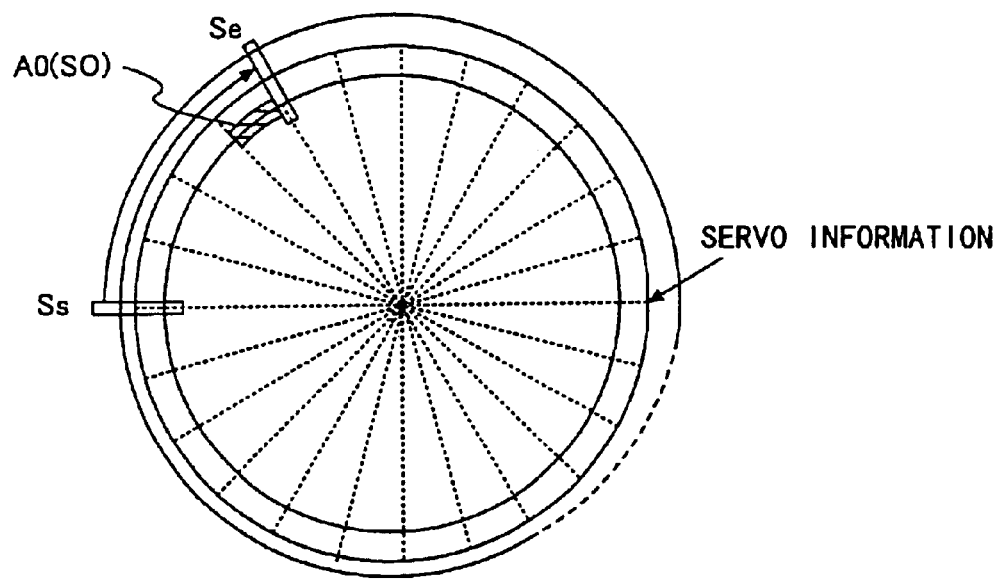
FIG. 12 is a diagram for explaining the operation of a third modification of the first embodiment of the disk unit.

FIG. 12 is a diagram for explaining the operation of a third modification of the first embodiment of the disk unit.

In this modification, a time it takes for the head 115 to separate from the disk 111 from the start of the ramp unload operation is measured in advance, and this measured time is used to calculate an address of the ramp unload position Ss so that the head 115 separates from the disk 111 at a desired head separating position Se shown in FIG. 12. As a result, it is possible to make the head 115 separate from the disk 111 at the desired head separating position Se.

In the first embodiment and the modifications thereof described above, the ramp load operation and the ramp unload operation are carried out in one or a plurality of specific regions A0 through A3 provided at the outer periphery of the disk 111. However, the ramp load operation and the ramp unload operation may be carried out uniformly in the circumferential direction of the disk 111.

Figure 13B:
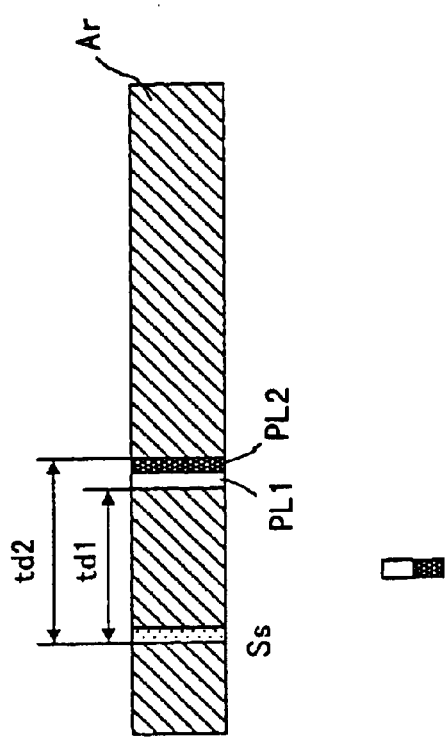
FIGS. 13A and 13B respectively are diagrams for explaining the operation of a second embodiment of the disk unit according to the present invention.
Figure 13A:
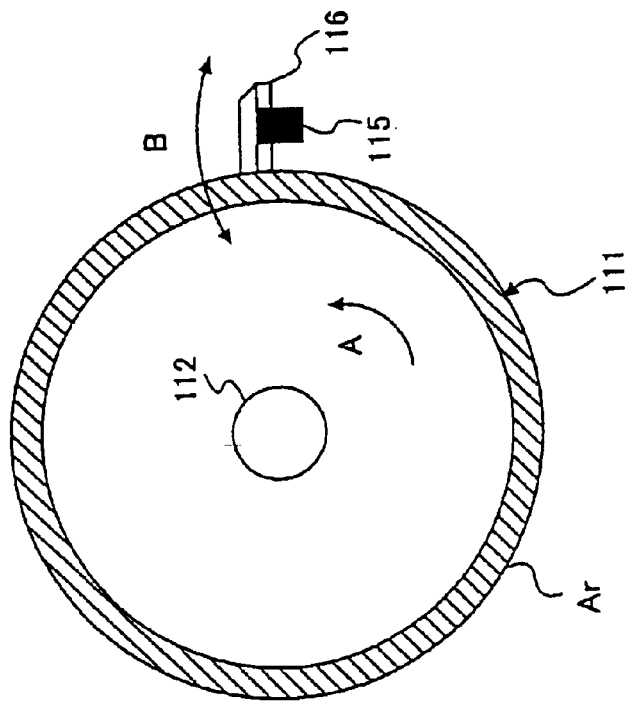

FIGS. 13A and 13B respectively are diagrams for explaining the operation of a second embodiment of the disk unit according to the present invention. In FIGS. 13A and 13B, those parts which are the same as those corresponding parts in FIGS. 1A, 1B, 2 and 3 are designated by the same reference numerals, and a description thereof will be omitted. The basic structure of this second embodiment of the disk unit is the same as the basic structure of the conventional disk unit 10 shown in FIGS. 1A, 1B and 2 described above, and a description and illustration thereof will be omitted.

In this embodiment, the movement of the head 115 is controlled so that the region on the disk 111 where the head 115 is loaded and unloaded during the ramp load operation and the ramp unload operation successively shifts by a predetermined distance in the circumferential direction of the disk 111.

For example, the region on the disk 111 where the head 115 is loaded and unloaded is successively shifted by the predetermined distance in the circumferential direction of the disk 111 in FIG. 13A, by detecting the rotary position of the spindle motor 112 which rotates the disk 111, delaying a time until the ramp load operation or the ramp unload operation is carried out from a time when the rotary position of the spindle motor 112 reaches a predetermined rotary position Ss, and a delay time td1 for the present ramp load or unload operation and a delay time td2 for the next ramp load or unload operation are made mutually different. In FIG. 13B, PL1 indicates a position where the head 115 lands on the disk 111 during the present ramp load operation and separates from the disk 111 during the present ramp unload operation, and PL2 indicates a position where the head 115 lands on the disk 111 during the next ramp load operation and separates from the disk 111 during the next ramp unload operation.

According to this embodiment, the ramp load operation and the ramp unload operation are uniformly carried out within a region Ar, indicated by the hatching, in the circumferential direction of the disk 111 as shown in FIG. 13A. For this reason, the deterioration of the protection layer on the region Ar due to the ramp load and unload operations becomes uniform, and the deterioration is not concentrated at a specific location within the region Ar. Consequently, the serviceable life of the protection layer can be extended, and it is possible to also record the data in the region Ar where the head 115 is loaded and unloaded with respect to the disk 111. Therefore, it is unnecessary to provide on the disk 111 a data recording prohibit region in which the head 115 is loaded and unloaded, and the storage capacity of the disk 111 can be increased effectively. The thickness of the protection layer is larger in at least the region Ar compared to other regions of the disk 111, so as to positively protect the disk 111 from the possible direct contact between the head 115 and the disk 111 during the ramp load and unload operations.

Figure 14:
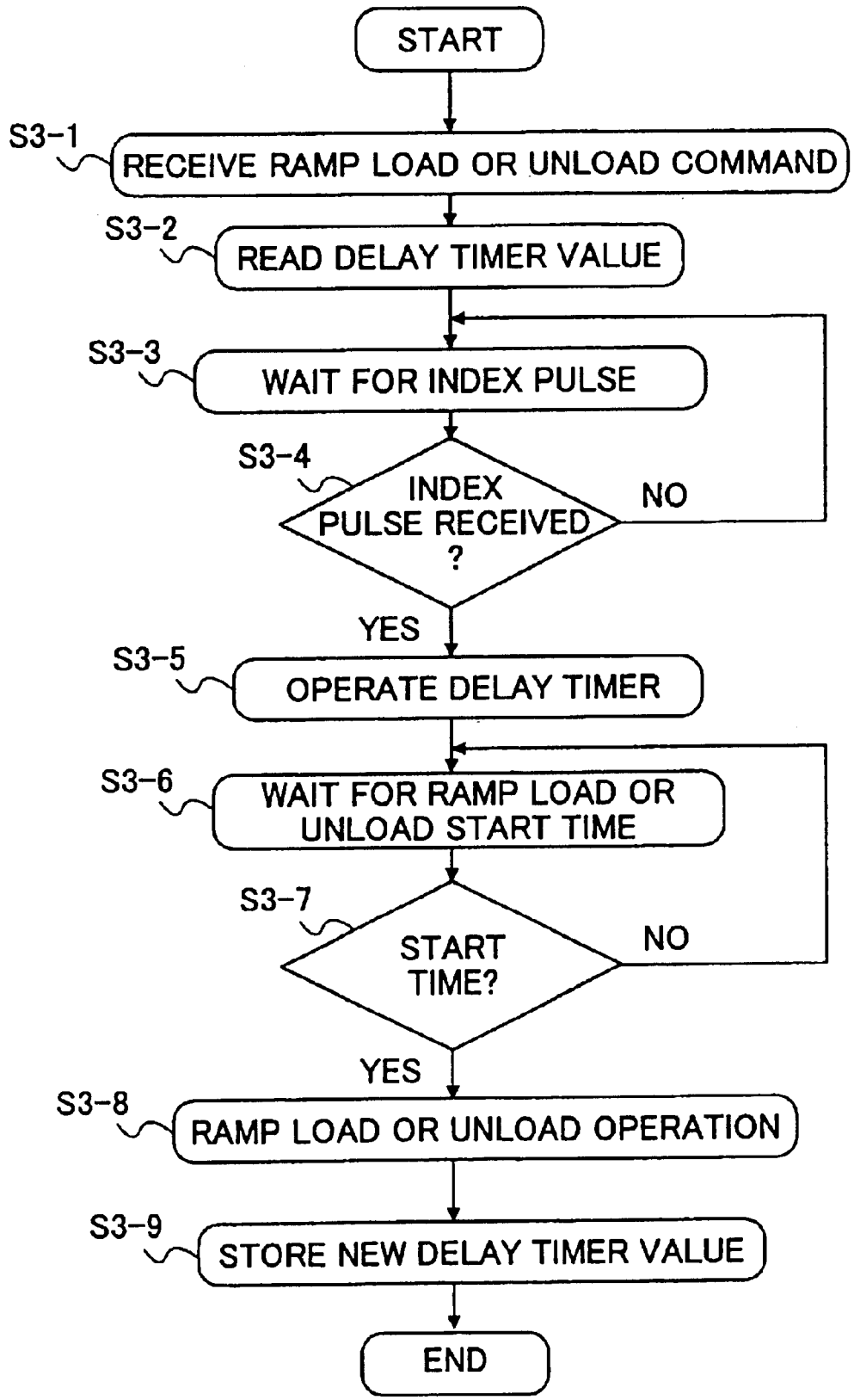
FIG. 14 is a flow chart for explaining the operation of the second embodiment of the disk unit.

Next, a description will be given of the operation of this second embodiment, by referring to FIG. 14 and FIGS. 15A through 15C. FIG. 14 is a flow chart for explaining the operation of this second embodiment of the disk unit. In addition, FIGS. 15A, 15B and 15C respectively are diagrams for explaining the operation of this second embodiment of the disk unit.

In FIG. 14, when the MPU 124 receives a ramp load or unload command from the hard disk controller 121 in a step S3-1, a step S3-2 reads a delay timer value which is stored in an internal register of the MPU 124, and a step S3-3 waits for an index pulse of the spindle motor 124. The index pulse is generated once per revolution of the spindle motor 124 so as to control the rotation of the spindle motor 124. For example, the index pulse is generated from the spindle motor 124.

A step S3-4 decides whether or not the index pulse is received. If the decision result in the step S3-4 is NO, the process returns to the step S3-3. On the other hand, if the decision result in the step S3-4 is YES, a step S3-5 operates a delay timer which is set with the delay timer value read by the step S3-2, and a step S3-6 waits for the ramp load or unload operation start time. A step S3-7 decides whether or not the ramp load or unload operation start time has come, that is, whether or not a time of the delay timer has occurred. The process returns to the step S3-6 if the decision result in the step S3-7 is NO.

If the decision result in the step S3-7 is YES, a step S3-8 starts the ramp load or unload operation. When a predetermined time elapses from the time when the ramp load or unload operation is started in the step S3-8, the head 115 lands on the disk 111 in the case of the ramp load operation or the head 115 separates from the disk 111 in the case of the ramp unload operation.

Next, a step S3-9 stores a new delay timer value in the internal register of the MPU 124. For example, the new delay timer value is set so that the delay timer value previously set in the internal timer successively changes by a value corresponding to the full width of the head 115 in the circumferential direction of the disk 111 as shown in FIG. 15B or, successively changes by a value corresponding to one-half the width of the head 115 in the circumferential direction of the disk 111 as shown in FIG. 15C. FIG. 15A corresponds to FIG. 13A described above, and in FIGS. 15B and 15C, the horizontal direction corresponds to the circumferential direction of the disk 111. Further, in FIGS. 15B and 15C, a black rectangular symbol indicates the present position of the head 115, and arrows indicate the successive shifts of the head position in the circumferential direction of the disk 111 for the successive ramp load or unload operations.

In this embodiment, the ramp load and unload timings are controlled based on the index pulse of the spindle motor 112. However, it is of course possible to detect the rotary position of the spindle motor 112 based on the back-electromotive voltage which is generated from the coils of the spindle motor 112, and to control the ramp load and unload timings based on the detected rotary position.

In the embodiments and modifications described above, the one or plurality of specific regions on the disk where the head is loaded and unloaded with respect to the disk are provided in the outer periphery of the disk. However, it is of course possible to provide each specific region in other regions on the disk, such as the inner periphery of the disk.

Moreover, the number of disks and the corresponding number of arms and heads of the disk unit are of course not limited to those of the embodiments and the modifications described above.

Further, the present invention is not limited to these embodiments, but various variations and modifications may be made without departing from the scope of the present invention.

What is claimed is:

1. A disk unit having a function of loading a head on a disk from a holding mechanism during a load operation and unloading the head from the disk during an unloading operation, comprising: a controller to control a movement of the head so that the loading operation and the unloading operation are carried out in a predetermined specific region on the disk, said specific region extending through an angular range smaller than 360° and being non-recordable.

2. The disk unit as claimed in claim 1, wherein the specific region is provided at a plurality of locations on the disk.

3. The disk unit as claimed in claim 1, further comprising:
a motor to rotate the disk,
said controller controlling the movement of the head so that the load operation and the unload operation are carried out based on a rotary position of the motor.

4. The disk unit as claimed in claim 1, wherein the specific region of the disk is prerecorded with a synchronizing signal.

5. The disk unit as claimed in claim 1, wherein data is recordable in regions of the disk other than the specific region.

6. The disk unit as claimed in claim 1, wherein said controller controls the movement of the head so that the unload operation is carried out in the specific region based on servo information which is prerecorded on the disk.

7. The disk unit as claimed in claim 1, wherein the disk is provided with a protection layer, and a thickness of the protection layer is larger in at least the specific region compared to other regions of the disk.

8. A disk unit having a function of loading a head on a disk from a holding mechanism during a load operation and unloading the head from the disk during an unloading operation, comprising:
a controller to control a movement of the head so that the loading operation and the unloading operation are carried out in a specific region on the disk, said specific region extending through an angular range smaller than 360° and being non-recordable; and a motor to rotate the disk, wherein said controller controls the movement of the head so that the load operation and the unload operation are carried out based on a rotary position of the motor, and said controller detects the rotary position of the motor a plurality of times during one revolution of the motor, and sets the specific region on the disk with respect to each detected rotary position of the motor.

9. A disk unit having a function of loading a head on a disk from a holding mechanism during a load operation and unloading the head from the disk during an unloading operation, comprising: a controller to control a movement of the head so that the loading operation and the unloading operation are carried out uniformly in a circumferential direction of the disk within a predetermined specific region on the disk, said specific region extending through an angular range smaller than 360° and being non-recordable.

10. A disk unit having a function of loading a head on a disk from a holding mechanism during a load operation and unloading the head from the disk during an unload operation, comprising:
a controller to control a movement of the head so that the loading operation and the unloading operation are carried out uniformly in a circumferential direction of the disk within a specific region on the disk, wherein said controller controls the movement of the head so that a position on the disk where the head is loaded during the load operation and the head is unloaded during the unload operation is successively shifted by a predetermined distance in the circumferential direction of the disk within the specific region on the disk for each load operation and each unload operation, and wherein said specific region extends through an angular range less than 360° and being non-recordable.

11. A disk unit having a function of loading a head on a disk from a holding mechanism during a load operation and unloading the head from the disk during an unload operation, comprising:
a controller to control a movement of the head so that the loading operation and the unloading operation are carried out uniformly by a circumferential direction of the disk within a specific region on the disk; and a motor to rotate the disk, said controller controlling the movement of the head so that a position on the disk where the head is loaded during the load operation and the head is unloaded during the unload operation is successively shifted by a predetermined distance in the circumferential direction of the disk within the specific region on the disk for each load operation and each unload operation, by detecting a rotary position of the motor and delaying a time until the load operation or the unload operation is carried out from a predetermined rotary position of the motor, and wherein said specific region extends through an angular range less than 360° and being non-recordable.

12. A disk unit having a function of loading a head on a disk from a holding mechanism during a load operation and unloading the head from the disk during an unload operation, comprising:
a controller to control a movement of the head so that the loading operation and the unloading operation are carried out uniformly in a circumferential direction of the disk within a specific region on the disk, wherein data is recordable in region of the disk including the specific region, and wherein said specific region extends through an angular range less than 360° and being non-recordable.

13. A disk unit having a function of loading a head on a disk from a holding mechanism during a load operation and unloading the head from the disk during an unload operation, comprising:
a controller to control a movement of the head so that the loading operation and the unloading operation are carried out uniformly in a circumferential direction of the disk within a specific region on the disk; and a motor to rotate the disk, said controller detecting a rotary position of the motor by detecting a back-electromotive voltage generated by a rotation of the motor, and controlling timings of the load operation and unload operation based on the detected rotary position, and wherein said specific region extends through an angular range less than 360° and being non-recordable.

14. The disk unit as claimed in claim 13, wherein said controller controls the movement of the head so that a position on the disk where the head is loaded during the load operation and the head is unloaded during the unload operation is successively shifted by a predetermined distance in the circumferential direction of the disk within the specific region on the disk for each load operation and each unload operation, based on the detected back-electromotive voltage.

15. A disk unit having a function of loading a head on a disk from a holding mechanism during a load operation and unloading the head from the disk during an unload operation, comprising:

a controller to control a movement of the head so that the loading operation and the unloading operation are carried out in a specific region on the disk, said specific region defined by a detection signal output from a detection circuit and extending through an angular range smaller than 360° and being non-recordable.

16. The disk unit as claimed in claim 15, wherein the specific region comprises a ramp load position Ss corresponding to a timing when a detection signal from a detection circuit makes a transition from a first level to a second level.

* * * * *